Patented Jan. 17, 1939

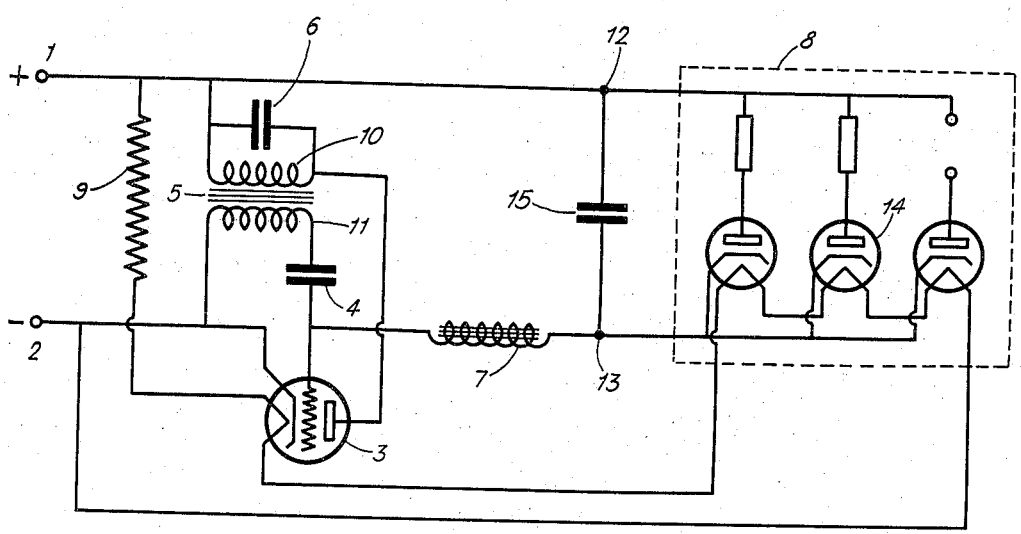
OTTO WOHLFARTH
GUENTHER DE NIEM
INVENTORS

2,144,237

UNITED STATES PATENT OFFICE 2,144,237

AMPLIFIER ARRANGEMENT

Otto Wohlfarth, Berlin, and Günther de Niem, Berlin-Lankwitz, Germany, assignors to Allgemeine Elektricitats Gesellschaft, Berlin, Germany, a corporation of Germany Application October 21, 1935, Serial No. 45,890
In Germany November 14, 1934

6 Claims. (Cl. 250—27)

This invention relates to a voltage converting device in which a direct current output voltage may be secured which is greater than the applied input voltage which may be of the direct or alternating type.

A further object of the invention is to provide an electron discharge device and circuit arrangement whereby the tube is used to generate oscillations and at the same time serve as a rectifier of alternating current which is impressed upon the circuit.

Further objects of the invention will become apparent as the description thereof proceeds. For a better understanding of the invention, however, reference is made to the accompanying drawing, in which the single figure is a schematic circuit diagram of one embodiment of the invention.

Referring to the drawing, the voltage supply source, which may be either direct current or an alternating current source, is connected to the input terminals 1, 2 the terminal 1 being connected to the positive terminal and 2 to the negative terminal, when a direct current supply source is used. As shown, an oscillator tube 3, has its cathode connected to terminal 2 and its plate connected to terminal 1 through the primary winding 10 of an iron core transformer 5. As shown a condenser 6 is connected across the primary 10 to form therewith a resonant circuit, the frequency at which tube 3 oscillates being that of circuit 6—10. One end of secondary 11 is connected to the cathode of 3 while its other end is connected to its control grid through condenser 4. The output terminals 12 and 13 are connected to the oscillator as shown, a filter choke or inductance coil 7 being connected between the control grid and terminal 13 if desired for the purpose of smoothing out the current pulsations.

Any desired load may be connected to the terminals 12—13, that shown comprising the plate-cathode circuits of the amplifier tubes 14 of a radio receiver 8. The heaters of the several tubes are connected in series and to terminals 1 and 2 through resistor 9. When an alternating voltage is supplied to terminals 1—2, during that half cycle when 1 is positive, current will flow between the grid and cathode of the tube 3 which acts as a diode rectifier. This rectifying action will build up a direct current voltage across the condenser 15. During the negative half cycle when terminal 1 and the grid of 3 are negative, the tube will be non-conducting, no current passing from its grid to cathode.

When a steady source of direct current is connected to the terminals 1—2, owing to the coupling between the plate and grid circuits of the tube, it will be set in oscillation and by virtue of the detecting action of the tube a voltage will be built up across condenser 4, the side of which is connected to the grid becoming more negative than the tube cathode. The voltage so built up across 4 will add to the voltage across terminals 1—2, and I have found that a voltage of 140 volts may be built up across 4 when a voltage of 110 volts is applied across terminals 1—2, thereby giving a substantially steady output voltage of 250 volts across the output terminals 12—13.

Having described our invention, what we claim as novel and desire to secure by Letters Patent is:

1. In a device of the class described, the combination of positive and negative input terminals, positive and negative output terminals, a lead directly connecting said positive output terminal to said positive input terminal, a vacuum tube oscillator having a cathode, grid and plate, a connection from the negative input terminal to said cathode, a grid circuit connecting said grid and cathode and including a single coil and condenser connected in series, a circuit connected between said positive input terminal and said plate and including a coil coupled to the coil of said grid circuit, and a circuit conductive to direct current connecting said grid and negative output terminal.

2. In a device of the class described, the combination of a pair of input terminals, a source of alternating current connected across said input terminals, positive and negative output terminals, a direct connection between one of the input terminals and the positive output terminal, a single electronic discharge tube having a grid circuit, a plate circuit and a cathode common to said circuits, said grid circuit including a series connected condenser, a direct current connection between said plate and the connection which is connected between the positive output terminal and its associated input terminal, a direct current connection between the other of said input terminals and said cathode, and a direct current connection between said negative output terminal and the negative side of said condenser.

3. In a device of the class described, the combination of a radio receiver having at least one amplifier stage and including an electronic discharge tube having a cathode, a heater and a plate, positive and negative input terminals, positive and negative output terminals, a lead directly connecting said positive output to said positive input terminal, a direct current connection between said positive output terminal and said plate, a lead connecting said cathode to said negative output terminal, an electronic discharge device consisting of a single oscillator tube having a cathode, a heater, a grid and a plate, a connection from the negative input terminal to said last named cathode, a grid circuit connecting said grid and cathode, a plate circuit connected to said plate and said positive input terminal, a feedback connection between said grid and plate circuits, a circuit conductive to direct current connecting said grid and negative output terminal, and a circuit arranged to connect the heaters of said tubes in series across said input terminals.

4. A voltage supply source comprising the combination of positive and negative input terminals, positive and negative output terminals, a condenser having its sides connected respectively to said output terminals, a direct current connection between the positive input and the positive output terminals, a single electron discharge tube having a cathode, control grid and anode, a direct current connection between said negative input terminal and cathode, an inductive reactance connecting said control grid and negative output terminal, a grid circuit connecting said grid and cathode and including a series connected condenser, and a circuit conductive to direct current connected between said positive input terminal and anode and including a feedback connection to said grid circuit.

5. A voltage supply system for energizing electron discharge tubes which are provided with at least a cathode and an anode, comprising a pair of input terminals which are adapted to be connected to a source of either direct current or alternating current, a direct current connection from one of said input terminals to the anodes of said discharge tubes, a connection from the other of said input terminals to the cathodes of the discharge tubes, said last named connection including the cathode to grid space of an auxiliary discharge tube, a circuit including the primary of a transformer and a condenser connected between said cathode and grid, and a second circuit including the secondary of said transformer connected between said direct current connection and the anode of the auxiliary discharge tube.

6. The system according to the invention defined in claim 5 wherein the discharge tubes and the auxiliary tube are provided with indirectly heated cathodes, and a circuit connecting the heaters of said cathodes in series, said circuit being connected across the input terminals of the system and including a series resistance.

OTTO WOHLFARTH.
GÜNTHER DE NIEM.